(12) United States Patent
Eubanks et al.

(10) Patent No.: US 7,963,388 B2
(45) Date of Patent: *Jun. 21, 2011

(54) SPLINE ROLLER FOR A BELT-DRIVEN ROLLER CONVEYOR, AND METHOD FOR MAKING

(75) Inventors: Ronald L. Eubanks, Erlanger, KY (US); John Erwin Treft, Fairfield, OH (US)

(73) Assignee: TKF Incorporated, Cincinnati, OH (US)

( * ) Notice: Subject to any disclaimer, the term of this patent is extended or adjusted under 35 U.S.C. 154(b) by 266 days.

This patent is subject to a terminal disclaimer.

(21) Appl. No.: 11/747,209

(22) Filed: May 10, 2007

(65) Prior Publication Data

US 2008/0277247 A1    Nov. 13, 2008

Related U.S. Application Data

(63) Continuation-in-part of application No. 11/268,335, filed on Nov. 7, 2005, now Pat. No. 7,306,091.

(60) Provisional application No. 60/625,512, filed on Nov. 5, 2004.

(51) Int. Cl.
*B65G 13/06* (2006.01)
(52) U.S. Cl. .............. 198/781.1; 198/789; 198/790; 198/780
(58) Field of Classification Search ........... 198/790, 198/780
See application file for complete search history.

(56) References Cited

U.S. PATENT DOCUMENTS

| 4,013,161 A | | 3/1977 | Nelson |
| 4,590,643 A | * | 5/1986 | Hill ................................ 452/112 |
| 5,348,140 A | * | 9/1994 | Clos .............................. 198/790 |
| 7,306,091 B2 | | 12/2007 | Eubanks et al. |

* cited by examiner

*Primary Examiner* — Gene Crawford
*Assistant Examiner* — Kavel Singh
(74) *Attorney, Agent, or Firm* — Hasse & Nesbitt LLC; Daniel F. Nesbitt

(57) ABSTRACT

A spline roller having a cylindrical barrel having a length, a first and second end, a centerline, and a circumferential surface, and at least a first drive portion formed integrally into the circumferential surface, having a first end and a second end, at least a first circumferential recess at the first end, and comprising a plurality of the parallel, radially-disposed, splines about the circumference, each spline extending along the length of the barrel from the first circumferential recess. Each spline has a ridge extending from the first end to the second end, and typically has a crown along the length of the ridge. The ridge can be oriented along a line that is parallel to the centerline of the spline roller, to provide a straight spline roller. The ridge can also be oriented along a line that is angled inwardly at a taper angle toward the centerline of the roller, to provide a tapered spline roller. Typically, each roller has a second drive portion adjacent to and axially disposed from the first drive portion.

19 Claims, 5 Drawing Sheets

SPLINE ROLLER FOR A BELT-DRIVEN ROLLER CONVEYOR, AND METHOD FOR MAKING

CROSS REFERENCE TO RELATED APPLICATIONS

This application is a continuation-in-part of application Ser. No. 11/268,335, filed Nov. 7, 2005, now U.S. Pat. No. 7,306,091, which claims the benefit of U.S. Provisional Application No. 60/625,512, filed Nov. 5, 2004.

BACKGROUND OF THE INVENTION

Conveyor roller systems are used by the manufacturing and transport, as well as other, industries in the movement of goods. One conventional system disclosed in U.S. Pat. No. 5,348,140 (incorporated herein by reference) provides a plurality of rollers, each having integrally-formed around the barrel portion of the roller, a plurality of radially-disposed, recessed splines configured to receive a series of lateral projections, e.g. ribs, disposed on an inner surface of a drive belt. The roller and the roller conveyor system provide a cost savings over rollers having swaged or welded gear teeth or sprockets. To advantageously accommodate design considerations, the recessed splines may be integrally-formed about the barrel portion of the roller on at least one end or intermediate the ends.

A problem confronted with belt-type conveyor is the movement or walking of the belt to one end or the other of the belt drive portion of the roller. In the field of flat belt conveying, it is known to provide at least one of the belt rollers or pulleys with a crown or a point of greater diameter, intermediate the length of the roller, which causes the belt to ride proximate its lateral midpoint at the crown of the roller or pulley.

SUMMARY OF THE INVENTION

The present invention provides an improved spline roller for use in roller conveyor assemblies and systems. The spline roller having a length, a first and second end, and a circumferential surface, comprising: (a) a cylindrical barrel portion and (b) at least a first drive portion formed integrally into the circumferential surface having a plurality of the parallel, radially-disposed, splines about the circumference of the barrel portion, and positioned intermediate the ends of the spline roller. The splines are typically recessed radially inwardly from the outer surface of the cylindrical barrel portion of the spline roller.

Each spline has a first longitudinal end to a second longitudinal end, and comprises a ridge extending from the first longitudinal end to the second longitudinal end. Adjacent splines form a valley there between. The ridge of each spline extends the length of the spline, and in a plane that passes through a centerline of the spline roller. The ridge can be substantially oriented along a line that is parallel to the centerline of the spline roller, or can be along a line that is angled or tapered inwardly at a taper angle toward the centerline of the roller and toward one end or the other of the spline roller.

The spline has a crown along the length of each ridge, typically disposed in the middle along the length of the ridge. The crown extends outward from the centerline of the spline roller a distance that is greater than the average of the distances of the first and second longitudinal ends of the spline from the centerline.

The at least a first drive portion also comprises a circumferential recess disposed adjacent to at least one, and typically both of, the first longitudinal end and the second longitudinal end. Typically, the circumferential recess overlaps the first and second longitudinal ends of the splines. The circumferential recess is formed into the circumferential surface to a distance from the centerline of the spline roller that is less than each of the first and second longitudinal ends of the splines.

Typically the spline roller comprises a second drive portion adjacent to and axially disposed from the first drive portion.

The present invention also relates to a curved roller conveyor assembly comprising: (a) a pair of frame members; (b) a plurality of the spline rollers, extending between and axially connected with the frame members; (c) at least one connecting belt, the belt engaging the drive portions of two adjacent spline rollers for rotationally coupling the tow adjacent spline rollers; and (d) a drive rotationally coupled to at least one of the spline rollers for imparting rotational motion. The conveyor assembly typically employs spline rollers that comprise a second drive portion adjacent to and axially disposed from the first drive portion. The connecting belt typically has an inner surface having spaced-apart ribs for engaging the plurality of valleys disposed between the ridges of adjacent splines. The conveyor drive can be coupled to at least one of the spline rollers by a drive belt that has an inner surface having spaced-apart ribs that engage the plurality of valleys disposed between ridges of adjacent splines of the roller. The drive can be a drive motor that powers a drive shaft connected to the drive belt. The drive shaft itself can have a driving portion that can also comprise a plurality of parallel, radially-disposed splines configured with valleys there between to receive the ribs of the drive belt. The drive can also be a self-powered spline roller.

The splines are typically formed integrally into the roller barrel, by mechanically crimping the circumferential surface.

The present invention also relates to a method for forming a spline roller comprising the steps of: (a) providing a cylindrical barrel having a length, and a first and second end; (b) forming at least one circumferential recess in the cylindrical barrel; and (c) forming a first drive portion by forming a plurality of parallel, radially-disposed, splines about the circumference of the barrel portion, intermediate the ends of the barrel, the plurality of splines having a first end that is formed over the circumferential recess. The method can further comprise the step (c) of forming a second drive portion adjacent to and axially disposed from the first drive portion.

These and other features will be readily apparent to those skilled in the art based upon the disclosure contained herein.

DETAILED DESCRIPTION OF THE INVENTION

Tapered Spline Roller

Figure 1:
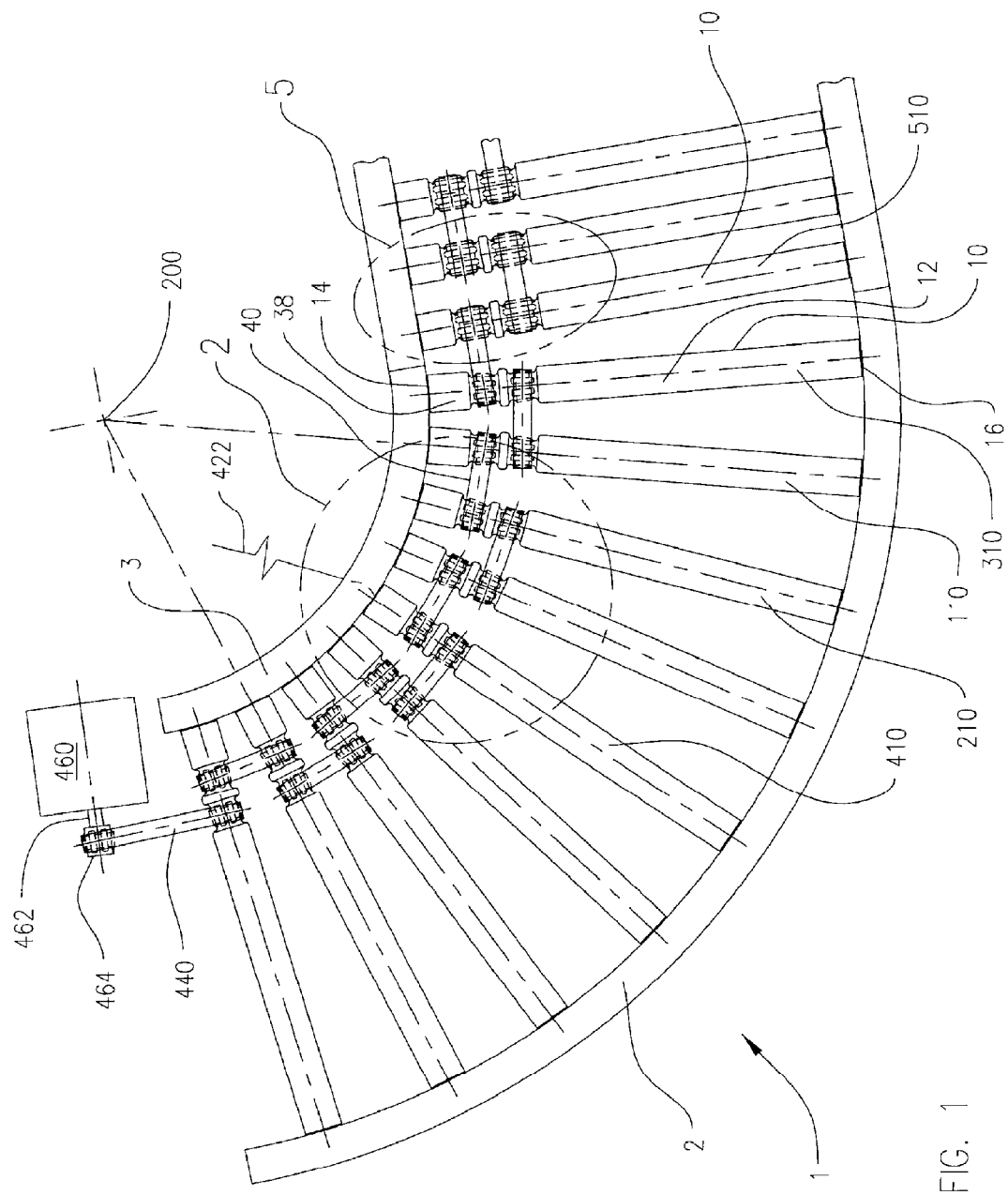
FIG. 1 shows a plan view of a curved roller conveyor assembly having a plurality of radially-disposed tapered spline rollers.

A spline roller 10, illustrated having tapered splines, is shown in FIGS. 1-4 having centerline 100, a first or inner end 14, and a second or outer end 16. Each roller 10 has an inner drive portion 20 and an outer drive portion 120, formed integrally with the cylindrical barrel portion 12 of the roller. The drive portion 20,120 is formed of a plurality of parallel, radially-disposed, tapered splines 22 disposed about the circumference of the roller, intermediate the main barrel portion 12 and the end barrel portion 38.

Each spline 22 has a first or inner longitudinal end 32 to a second longitudinal end 33, and comprises a ridge 50 extending from the first longitudinal end 32 to the second longitudinal end 33. The ridge 50 is illustrated as a substantially flat surface in cross section shown in FIG. 3, but can also be more rounded or peaked. Adjacent splines 22 form a valley or slot 24 there between. The ridge 50 of each spline extends the length of the spline, and lies in a plane 300, shown in FIG. 3, that passes through a centerline 100 of the spline roller 10. The ridge 50 is substantially oriented along a line that is angled or tapered inwardly at a taper angle α toward the centerline 100 of the roller and toward the second end 33 of the spline roller.

Each of the splines 22 is typically recessed radially inwardly from the outer surface 18 of the barrel portion.

The splines 22 are tapered inwardly at a taper angle toward the centerline 100 of the roller, along the length of the spline, from the inner end 14 toward the outer end 16 of the roller. Between each pair of tapered splines 22 is valley 24 that projects inward toward the centerline 100 of the roller.

The spline roller also has a circumferential recess 30 that is disposed adjacent the inner end 32 of the tapered splines 22. The recess is typically also formed on the outer end 33 of the splines, shown as circumferential recess 34. Typically, the tapered splines 22 are formed with their ends 32, 33 into or over the circumferential recess 30, 34, respectively. Typically, the valleys 24 extend completely into the circumferential recesses at each end of the splines. The length of the ridge 50 of the splines 22 is typically at least the width of the connecting belt 40.

The presence of the circumferential recesses 30, 34 at each end 32, 33 of the splines 22 facilitate formation of a crown 54 disposed proximately intermediate the ridge 50 length of the spline 22. The crown 54 extends outward from the centerline 100 of the spline roller 10 a distance d3 that is greater than the average of the distances d1 and d2 of the first inner end 32 and outer longitudinal end 33, respectively, of the spline from the centerline 100. The crown 54 extends outward from the line or surface that connects the first, inner end 32 and second, outer end 33 of the spline. The plurality of crowns 54 formed on the plurality of splines 22 cooperate to facilitate the dynamic positioning of the conveyor belt 40, which registers the center of the belt 40 with the crowns 54 and maintains alignment of the revolving belt.

Without being bound by any particular theory, it is believed that by first forming the circumferential grooves 30 and 34 in the barrel portion, and then forming the plurality of radially disposed splines, such as by mechanical crimping, the ends 30 and 33 of crimpled splines formed into the sidewalls of the circumferential recess are drawn inwardly by the circumferential grooves relative to the middle portion of the splines.

Straight Spline Roller

Figure 7:
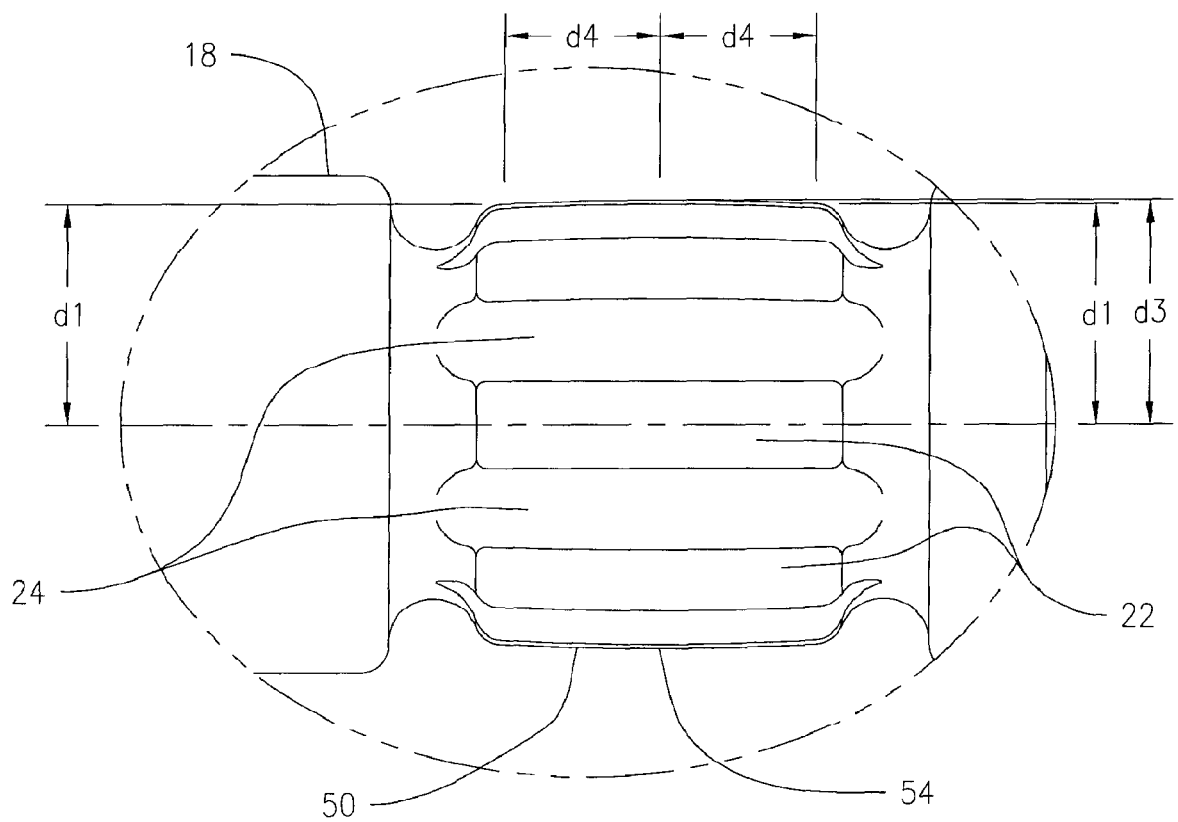
FIG. 7 shows an exploded plan view of the drive portions of the straight spline rollers of FIG. 5.
Figure 5:
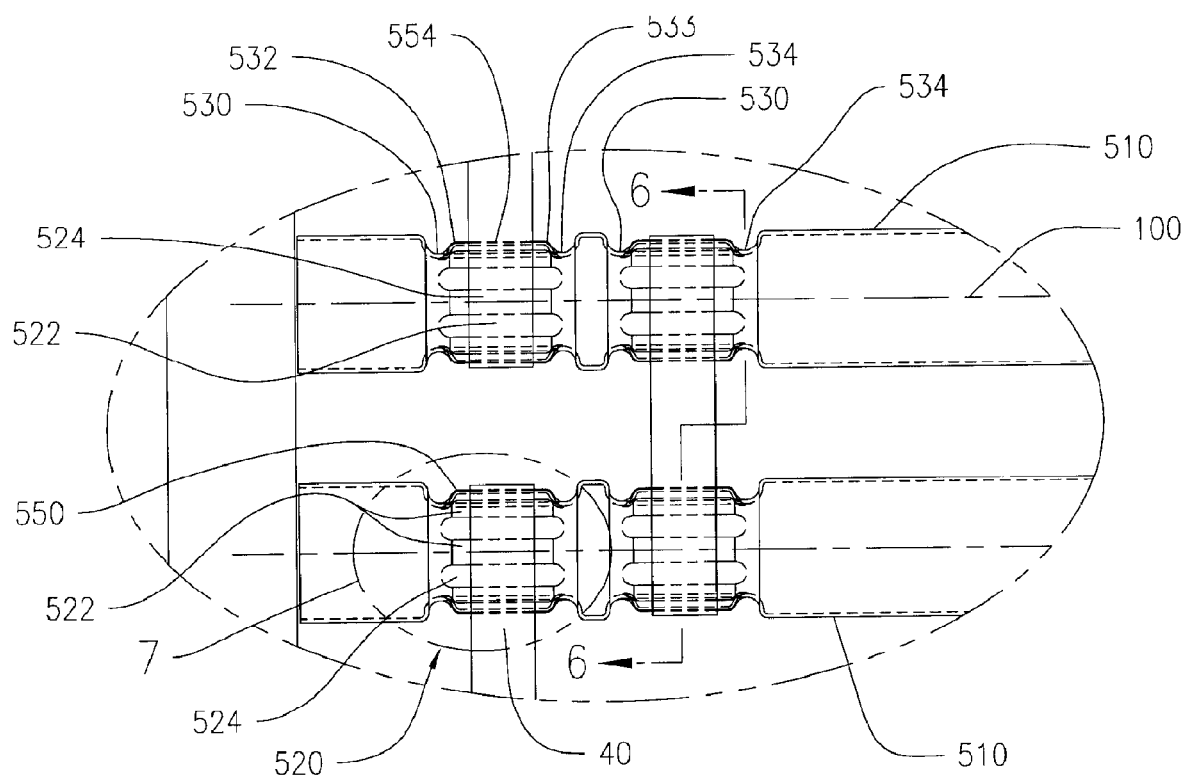
FIG. 5 shows a plan view of a straight spline conveyor roller of the present invention.
Figure 6:
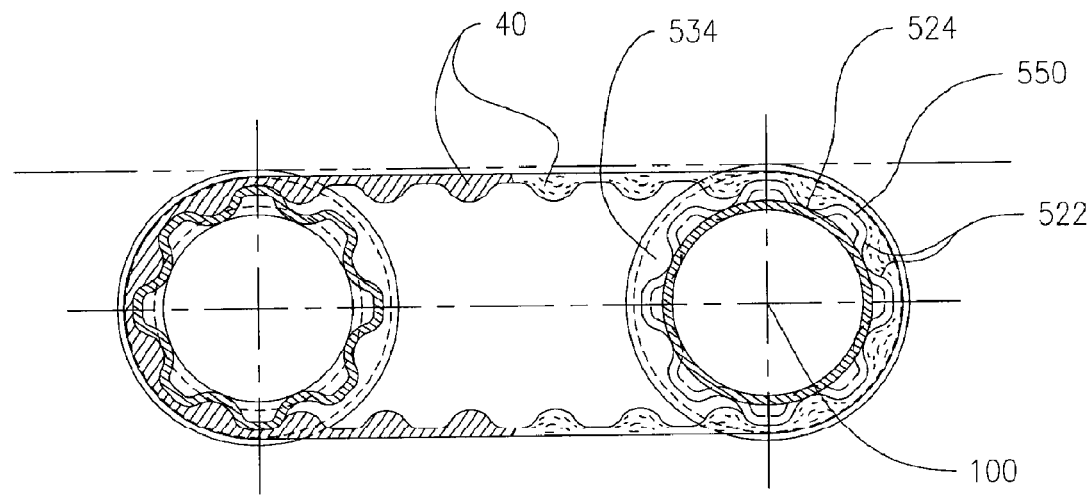
FIG. 6 shows a cross-sectional view of the drive portion of the straight spline roller, taken through line 6-6 of FIG. 5.

In an alternative embodiment shown in FIGS. 5-7, a straight spline roller 510 is shown having at least one straight spline drive portion 520. The straight spline drive portion 520 has a plurality of straight splines 522 disposed radially around the circumference of the barrel portion of the roller, spaced apart by a plurality of valleys 524. The ridge 550 is substantially oriented along a line that is parallel to the centerline 100 of the straight spline roller. Each straight spline drive portion has circumferential recesses 530 and 534 at each end 532 and 533 of the splines 522. As above, the circumferential recesses facilitate formation of a crown 554 disposed proximately intermediate the ridge 550 along the length of the spline 522. The crown 554 extends outward from the centerline 100 of the spline roller 510 a distance d3 that is greater than the average of the distances d1 and d2 of the first inner end 532 and outer longitudinal end 533, respectively, of the spline from the centerline 100. The plurality of crowns 554 formed on the plurality of splines 522 cooperate to facilitate the dynamic positioning of the conveyor belt 40, which registers the center of the belt 40 with the crowns 554 and maintains alignment of the revolving belt.

The straight spline roller of the present invention are useful in belted roller conveyor systems such as that disclosed in U.S. Pat. No. 5,348,140, incorporated herein by reference.

Roller Conveyor systems

Referring to FIG. 1, a curved roller conveyor assembly 1 is shown having a curved conveying path that is radially displaced from a focus point 200. The conveying assembly includes a pair of spaced-apart frame members, shown as outer frame 2 and inner frame 3. Typically the distance between the inner and outer frames, or width of the conveying path, projected along lines radiating from focus point 200, is the same length.

Positioned between the pair of frames 2 and 3 are a plurality of the tapered spline rollers 10. In the illustrated embodiment, the rollers 10 are positioned along centerlines 100 radiating from the focus point 200. The rollers 10 have a first or inner end 14, disposed adjacent to and rotationally affixed to the inner frame 3, and a second or outer end 16, disposed adjacent to and rotationally affixed to the outer frame 2. The rollers 10 can be affixed to the frames conveniently with hexagonal fasteners. The size, number and spacing between adjacent rollers are a design consideration, depending upon the size and shape of particular articles that are to be conveyed along the top surfaces of the rollers.

The rollers 10 have one or more drive portions 20 disposed intermediate the ends 14 and 16 of the roller, along the length of the barrel portion 12. Typically, the drive portions are disposed proximate to one end or the other of the rollers. In the illustrated embodiment, the drive portions 20 are disposed proximate the inner frame 3, with a main barrel portion 12 outboard of the drive portion 20, and a minor barrel portion 38 inboard of and between the drive portion 20 and the inner frame 3.

A plurality of connecting belts 40 are positioned around the inner drive portions 20, and around the outer drive portions 120, between adjacent rollers. The belts can be formed of an elastomeric material such as rubber, neoprene, nylon, or of a composite material such as a reinforced rubber, neoprene, and nylon. Belts formed of an elastomeric or composite material are commercially available and are preferred over metal link chain inasmuch as elastomeric belts are quieter and generally allow for much higher conveyor speeds. Moreover, elastomeric or composite belts facilitate conveyor assembly by positioning the belts around adjacent and successive pairs of rollers prior to their positioning and installation into the curved frame members 2 and 3.

Figure 2:
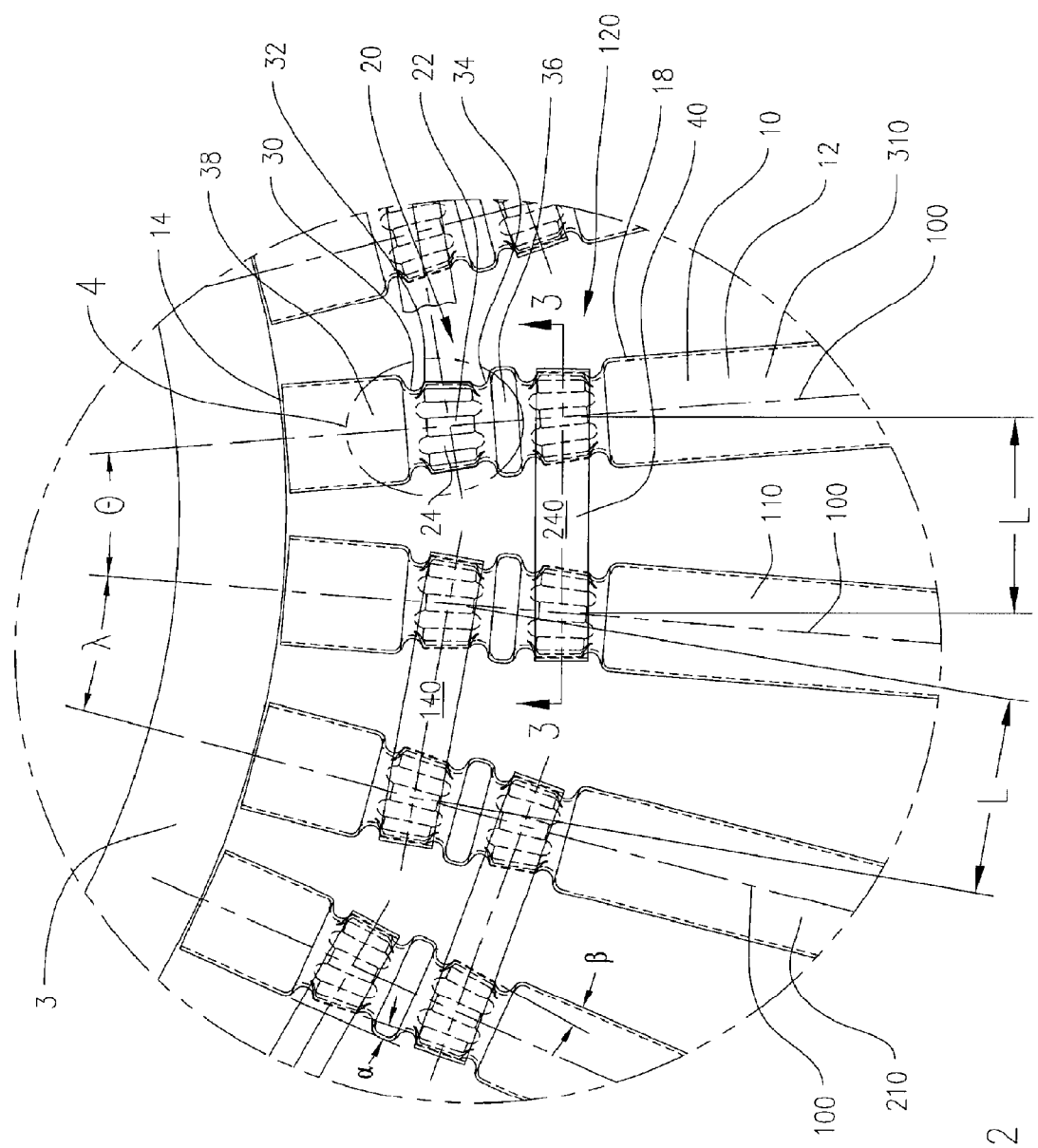
FIG. 2 shows an exploded plan view of the drive portions of the tapered spline rollers of FIG. 1.

FIG. 2 shows an exploded view of the inner end 14 and drive portions of several rollers 10. Each roller 10 is shown wherein its centerline 100 is aligned through the focus point 200, shown in FIG. 1.

Figure 3:
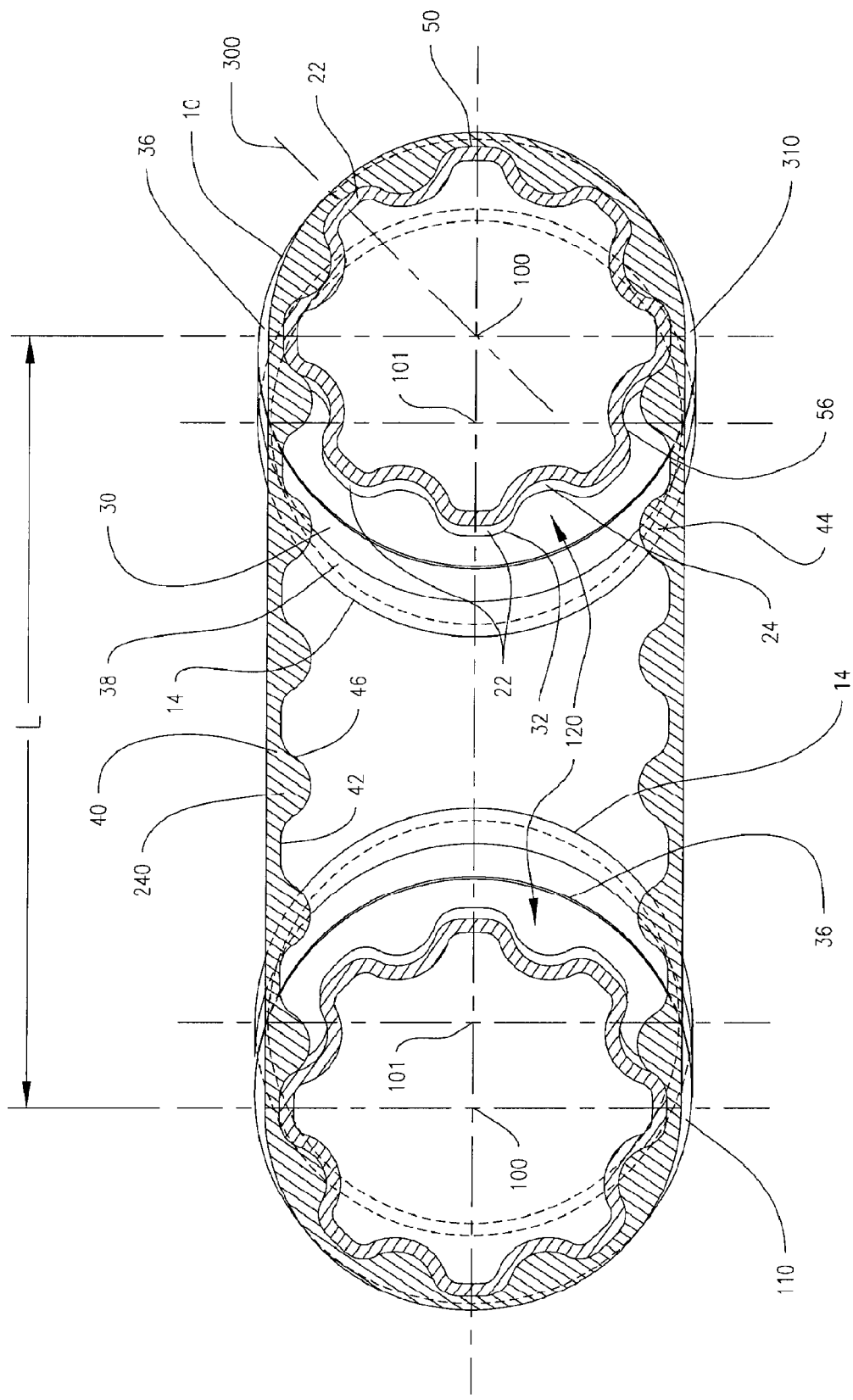
FIG. 3 shows an elevation cross-section through the drive portion and belt of the rollers, taken through line 3-3 of FIG. 2.
Figure 4:
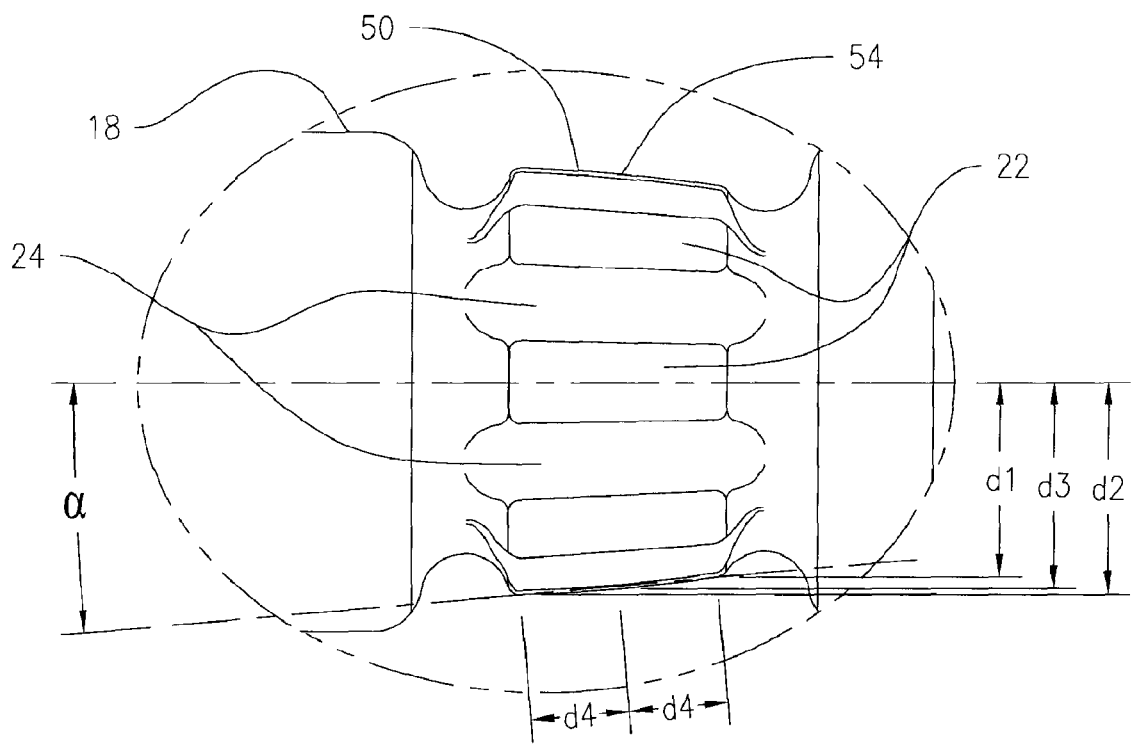
FIG. 4 shows a further exploded view of one of the drive portions of the tapered spline roller of FIG. 2.

As also shown in FIG. 3, recessing of the splines can prevent the connecting belt 40 from extending above the conveying surface formed by the upper surfaces 18 of the conveying rollers. This enables an article to be conveyed along the roller conveyors over the drive portions of the roller without interference with the revolving belts 40.

The illustrated embodiment of the rollers 10 comprise a first inner drive portion 20 and a second outer drive portion 120, the outer drive portion 120 being disposed outboard of the inner drive portion 20 along the length of the barrel 12, with the drive portions 20 and 120 being separated by a spacer portion 36. As shown in FIG. 2, a roller 10 is typically associated with two separate connecting belts 40. An inner belt 140 is associated with the inner drive portions 20 of rollers 110 and 210. An outer belt 240 is associated with the outer drive portions 120 of rollers 110 and 310. It can be seen that additional connecting belts 140 and 240 alternately associate successive adjacent rollers 10.

To permit a linear belt 40 to rotationally connect the outwardly-radiating adjacent rollers 20, the splines 22 of the drive portions are inwardly tapered, whereby the crown surface of the outer splines 22 engaging the ends of the connecting belts 40 are parallel. As shown in FIG. 2, the tapered splines of the inner drive portion 20 have a taper angle $\alpha$, and the tapered splines of the outer drive portion 120 have a taper angle $\beta$. Preferably, the taper angle $\alpha$ is one-half of the angle $\gamma$ formed between the centerlines 100 of inner-belt coupled rollers 110 and 210, and the taper angle $\beta$ is one-half of the angle $\theta$ formed between the centerlines 100 of outer-belt coupled rollers 110 and 310. When the connecting belts 140 and 240 are of equal length L, as is typical, the inner taper angle $\alpha$ and the outer taper angle $\beta$ can be different, and the angle $\gamma$ formed between inner-belt coupled rollers 110 and 210 is different from the angle $\theta$ formed between outer-belt coupled rollers 110 and 310.

FIG. 3 shows a cross section of the outer drive portions 120 of adjacent rollers 110 and 310, and their associated connecting belt 240. (The interior details of the rollers 110 and 310 have been omitted from the figures.) The view demonstrates that the ends 14 of the adjacent rollers 110 and 310 are angled radially inwardly toward focus point 200 (shown in FIG. 1), such that their respective centerlines 100 pass through the centerpoints 101 of the roller ends 14. The belt 240 has an inner surface having a plurality of spaced apart ribs 44 separated by gaps 42 that transition to the rib 44 through slopes 46, where the ribs 44 are configured to register with the slots 24 of the drive portions 120 of the adjacent rollers 110 and 310. The pitch of the splines 22 of the drive portions is selected to equal the pitch of the ribs 44 of the drive belt 40.

While the figures show the depth of the valley 24 corresponding with the depth of the ribs 44, the invention includes embodiments where the valley is formed with a depth greater than that of the rib 44, and where the sloping sides 56 of the splines are do not conform exactly to the corresponding shape and slope of the ribs 44, and typically are at least slightly more steeply formed, so that the primary contact between the splines 22 and the belts 40 are the sloping sides 56 of the splines and the slopes 46 of the belts.

Referring to FIGS. 1-3, an example embodiment of a tapered conveyor roller having tapered splines is a curved roller conveyor has 14 rollers and 13 connecting belts through a 90° turn. The inner radius of the curve is 18 inches (45.7 cm), measured to the inner end 14 of the rollers. A standard 2.5 inch ribbed drive belt is used (available from T.K.F., Inc., model #4202-0250), having 2.5 inch (6.35 cm) roller centers. The rollers are 24 inches (61 cm) wide, with the first and second driver portions positioned near the inner end 14 of the rollers. The centers of the inner belt 140 and outer belt 240 are positioned 21 inches (53.34 cm) and 23⅛ inches (58.74 cm) from the focus point 200, respectively. The geometry of the assembly dictates that the inner taper angle $\alpha$ of the tapered splines 22 of the inner drive portion 20 is 3.3923°, and the outer taper angle $\beta$ of the tapered splines 22 of the outer drive portion 120 is 3.0819°. The angular distance between adjacent rollers having a belt 40 connecting the inner drive portions 20 is 6.7845° (2×3.3923°), and the angular distance between adjacent rollers having a belt 40 connecting the outer drive portions 120 is 6.1638° (2×3.0819°).

The rollers of the conveyor assembly can be driven by a variety of means. In one embodiment, a tapered spline roller 20 can be configured with a self-powered drive mechanism, shown as a self-powered master roller 410 in FIG. 1 supplied with electrical power 422, which can drive adjacent rollers rotationally connected thereto. An example of a self-powered roller can be found in U.S. Pat. No. 6,450,325, incorporated herein by reference. The driven adjacent rollers then in turn drive successive, rotationally-connected rollers. Alternatively, also as shown in FIG. 1, the drive can be a drive motor, 460 that powers a drive shaft 462, which is turn in connected, directly or indirectly, to a drive belt 440. Depending upon design considerations, drive motor 460 can be coupled to a gear reducer (not shown) to reduce roller speed and to increase driving torque. The drive belt can also be driven by a splined driving portion, such as the tapered spline drive 464, which comprises a plurality of parallel, radially-disposed splines, configured with slots there between to receive the ribs of the drive belt.

The straight spline roller of the present invention are useful in belted roller conveyor systems such as that disclosed in U.S. Pat. No. 5,348,140, incorporated herein by reference.

The invention also relates to a method for forming the tapered and straight spline rollers. The method starts with a length of a conventional tubular roller barrel, having the first and second ends. Prior to crimping of the splines into the barrel, one or more circumferential recesses are formed into the periphery of the barrel at a position where an end of the tapered splines is to be formed. The circumferential recess is formed to a first depth, deforming the material of the barrel periphery toward the centerline of the barrel.

Then a crimping die is used, configured in two or more die parts, and having a plurality of slot-shaped teeth projecting inwardly, oriented along the length of the barrel. The crimping die is forced radially inwardly against the outer circumferential surface of the barrel between adjacent circumferential recesses, to emboss or impress by crimping the plurality of splines and associated slots or valleys. The formed splines have ridges aligned along the longitudinal axis of the roller that are recessed radially inwardly from the outer surface of the barrel portion. The ridges are formed by the spaces between the slot-shaped teeth of the crimping die. Between the radially disposed splines are valleys or slots, formed by the slot-shaped teeth of the crimping die. Typically the ridges are formed to a depth less than that of the circumferential recesses. The recesses ensure that the length of the spline forms a crown on which the connecting belt can ride and remain dynamically aligned. More preferably, a second drive portion is also formed adjacent to the first drive portion.

When forming tapered spline drive portions in a barrel, the teeth of the crimping die are angled along their length inwardly at one end relative to the other end, such that the formed spline is tapered as described above.

While specific embodiments of the apparatus and method of the present invention have been described, it will be apparent to those skilled in the metalworking arts that various modifications thereto can be made without departing from the spirit and scope of the present invention as defined in the appended claims.

We claim:

1. A spline roller comprising:
   (a) a cylindrical barrel having a length, a first and second end, a centerline, and a circumferential surface, and
   (b) at least a first drive portion formed integrally into the circumferential surface, having a first end and a second end, at least a first circumferential recess at the first end, and comprising a plurality of the parallel, radially-disposed, splines about the circumference that are recessed radially inwardly from the circumferential surface, each spline extending from the first circumferential recess to the second end,
   wherein the first circumferential recess has a first depth from the circumferential surface of the barrel, and wherein the splines have a ridge having a second depth from the circumferential surface that is less than the first depth.

2. The spline roller according to claim 1 wherein the ridge extends from the first end to the second end.

3. The spline roller according to claim 2 further having a crown along the length of the spline.

4. The spline roller according to claim 2 wherein the ridge of each spline extends within a plane that passes through a centerline of the spline roller, and is oriented along a line that is parallel to the centerline of the spline roller.

5. The spline roller according to claim 2 wherein the ridge of each spline extends within a plane that passes through a centerline of the spline roller, and is oriented along a line that is angled inwardly at a taper angle toward the centerline of the roller.

6. The spline roller according to claim 3 wherein the crown is in the middle between the first end and second end.

7. The spline roller according to claim 1 further having a second circumferential recess at the second end of the first drive portion, and wherein each spline extends to the second circumferential recess.

8. The spline roller according to claim 7 further having a crown in the ridge along the length of the spline between the first end and second end.

9. The spline roller according to claim 8 wherein the first circumferential recess is formed into the circumferential surface to a first distance from the centerline of the spline roller, and wherein a plurality of valleys formed between the plurality of splines are formed to a second distance from the centerline that is greater than the first distance.

10. The spline roller according to claim 1, further comprising a second drive portion adjacent to and axially disposed from the first drive portion.

11. The spline roller of claim 10, wherein each the splines of the first drive portion and each of the splines of the second drive portion has a ridge extending from the first end to the second end, wherein the ridge of each spline of the first drive portion extends within a plane that passes through a centerline of the spline roller, and is oriented along a line that is angled inwardly at a first taper angle toward the centerline of the roller, wherein the ridge of each spline of the second drive portion extends within a plane that passes through a centerline of the spline roller, and is oriented along a line that is angled inwardly at a second taper angle toward the centerline of the roller, and wherein the taper angle of the splines of the first drive portion is different than the taper angle of the splines of the second drive portion.

12. A method for forming a spline roller comprising the steps of: (a) providing a cylindrical barrel having a length, a first and second end, a centerline, and a circumferential surface; (b) forming at least one circumferential recess in the circumferential surface of the cylindrical barrel; and (c) forming a first drive portion by forming integrally into a first drive region of the circumferential surface adjacent to the at least one circumferential recess, a plurality of parallel, radially-disposed, splines about the circumference of the first drive region, the plurality of splines having a first end that is formed over a portion of the at least one circumferential recess, and including a ridge that extends through the first drive region.

13. The method according to claim 12 wherein the step (b) further comprises forming a second circumferential recess in the cylindrical barrel spaced apart axially from the at least one circumferential recess, wherein a second end of the plurality of splines is formed over a portion of the second circumferential recess.

14. The method according to claim 12 wherein each ridge extends within a plane that passes through a centerline of the spline roller, and is oriented along a line that is angled inwardly at a taper angle toward the centerline of the roller.

15. The method according to claim 12 further comprising forming a second drive portion integrally into the circumferential surface, axially disposed from the first drive portion.

16. The method according to claim 12 wherein the at least one circumferential recess is formed to a first depth from the circumferential surface of the barrel, and the ridges of the plurality splines are formed to a second depth from the circumferential surface that is less than the first depth.

17. The method according to claim 16 wherein each ridge extends within a plane that passes through a centerline of the spline roller, and is oriented along a line that is parallel to the centerline of the roller.

18. The method according to claim 16 further comprising forming a second drive portion integrally into the circumferential surface, axially disposed from the first drive portion.

19. The method according to claim 13 wherein the step of forming forms a crown in the ridge along the length of the spline between the first end and second end.

* * * * *